United States Patent
Hodsdon

(10) Patent No.: US 10,894,345 B2
(45) Date of Patent: Jan. 19, 2021

(54) LINEAR ACTUATOR LEVERAGE

(71) Applicant: Velcro BVBA, Deinze (BE)

(72) Inventor: Jerry G. Hodsdon, Manchester, NH (US)

(73) Assignee: Velcro BVBA, Deinze (BE)

( * ) Notice: Subject to any disclaimer, the term of this patent is extended or adjusted under 35 U.S.C. 154(b) by 476 days.

(21) Appl. No.: 15/797,164

(22) Filed: Oct. 30, 2017

(65) Prior Publication Data

US 2019/0126522 A1 May 2, 2019

(51) Int. Cl.
| | | |
|---|---|---|
| B29C 43/58 | (2006.01) | |
| B29C 43/24 | (2006.01) | |
| B29C 43/46 | (2006.01) | |
| B29C 43/28 | (2006.01) | |
| B29L 31/00 | (2006.01) | |

(52) U.S. Cl.
CPC ............ B29C 43/58 (2013.01); B29C 43/24 (2013.01); B29C 43/245 (2013.01); B29C 43/46 (2013.01); B29C 43/28 (2013.01); *B29C 2043/467* (2013.01); *B29C 2043/5808* (2013.01); *B29L 2031/729* (2013.01)

(58) Field of Classification Search
CPC ....... B29C 43/58; B29C 43/24; B29C 43/245; B29C 43/46; B29C 43/28; B29C 2043/467; B29C 2043/5808
USPC .......................................................... 264/175
See application file for complete search history.

(56) References Cited

U.S. PATENT DOCUMENTS

| | | |
|---|---|---|
| 3,230,134 A | 1/1966 | Studer |
| 3,266,113 A | 8/1966 | Flanagan |
| 3,267,191 A | 8/1966 | Williams et al. |
| 3,312,583 A | 4/1967 | Rochlis |
| 3,445,915 A | 5/1969 | Cuckson et al. |
| 3,462,332 A | 8/1969 | Goto |
| 3,557,413 A | 1/1971 | Engle |
| 3,594,865 A | 7/1971 | Erb |

(Continued)

FOREIGN PATENT DOCUMENTS

| | | |
|---|---|---|
| DE | 1937746 | 2/1970 |
| DE | 2109652 | 9/1972 |

(Continued)

OTHER PUBLICATIONS

PCT International Search Report in International Application No. PCT/EP2018/078156, dated Jan. 24, 2019, 13 pages.

(Continued)

*Primary Examiner* — Jeffrey M Wollschlager
*Assistant Examiner* — Xue H Liu
(74) *Attorney, Agent, or Firm* — Fish & Richardson P.C.

(57) ABSTRACT

A linear actuator leverage assembly including a base with a side surface and a back surface defining between them a corner, a rail member coupled to the base, a lever arm with a bearing surface, and a linear actuator. The lever arm is pivotally connected to the rail member at a first pivot and to the linear actuator at a second pivot. The linear actuator is configured to move the rail member with respect to the base over a linear stroke of the linear actuator that moves the second pivot of the lever arm along a continuous motion path. The motion path includes a first path segment generally parallel to the side surface and a second path segment, over which the lever arm pivots about the bearing surface as a fulcrum, thereby increasing leverage applied by the actuator to the rail.

21 Claims, 11 Drawing Sheets

(56) References Cited

U.S. PATENT DOCUMENTS

| | | | |
|---|---|---|---|
| 3,600,766 A | 8/1971 | Alberts | |
| 3,608,035 A | 9/1971 | Frohlich | |
| 3,726,752 A | 4/1973 | Provost | |
| 3,758,657 A | 9/1973 | Menzin et al. | |
| 3,843,760 A | 10/1974 | Teed | |
| 3,956,056 A | 5/1976 | Boguslawski et al. | |
| 3,983,278 A | 9/1976 | Wardle | |
| 4,001,366 A | 1/1977 | Brumlik | |
| 4,056,593 A | 11/1977 | De Navas Albareda | |
| 4,097,634 A | 6/1978 | Bergh | |
| 4,189,809 A | 2/1980 | Sotos | |
| 4,329,196 A | 5/1982 | Rawlinson | |
| 4,451,421 A | 5/1984 | Jones et al. | |
| 4,615,084 A | 10/1986 | Erb | |
| 4,726,975 A | 2/1988 | Hatch | |
| 4,775,310 A | 10/1988 | Fischer | |
| 4,784,890 A | 11/1988 | Black | |
| 4,794,028 A | 12/1988 | Fischer | |
| 4,872,243 A | 10/1989 | Fischer | |
| 4,894,060 A | 1/1990 | Nestegard | |
| 4,931,344 A | 6/1990 | Ogawa et al. | |
| 4,933,224 A | 6/1990 | Hatch | |
| 4,999,067 A | 3/1991 | Erb et al. | |
| 5,260,015 A | 11/1993 | Kennedy et al. | |
| 5,393,475 A | 2/1995 | Murasaki et al. | |
| 5,441,687 A | 8/1995 | Murasaki et al. | |
| 5,518,795 A | 5/1996 | Kennedy et al. | |
| 5,669,120 A | 9/1997 | Wessels et al. | |
| 5,744,080 A | 4/1998 | Kennedy et al. | |
| 5,945,131 A | 8/1999 | Harvey et al. | |
| 6,045,349 A | 4/2000 | Ishida et al. | |
| 6,066,281 A | 5/2000 | Provost | |
| 6,099,289 A | 8/2000 | Jens et al. | |
| 6,248,419 B1 | 6/2001 | Kennedy et al. | |
| 6,737,147 B2 | 5/2004 | Kennedy et al. | |
| 7,048,818 B2 | 5/2006 | Krantz et al. | |
| 9,649,792 B2 | 5/2017 | Gallant | |
| 2003/0034583 A1 | 2/2003 | Provost | |
| 2003/0213549 A1 | 11/2003 | McAmish et al. | |
| 2004/0201124 A2 | 10/2004 | Harvey et al. | |
| 2006/0260484 A1 | 11/2006 | Mizunuma | |
| 2007/0035060 A1 | 2/2007 | Harvey et al. | |
| 2010/0300171 A1 | 12/2010 | Hanson | |
| 2013/0280474 A1 | 10/2013 | Medina et al. | |
| 2016/0193757 A1 | 7/2016 | Sugimoto et al. | |
| 2017/0066176 A1 | 3/2017 | Hausl | |

FOREIGN PATENT DOCUMENTS

| | | |
|---|---|---|
| EP | 0580073 | 1/1994 |
| EP | 1286605 | 3/2003 |
| EP | 3015243 | 5/2016 |
| FR | 1117251 | 5/1956 |
| FR | 2082591 | 12/1971 |
| FR | 2348801 | 11/1977 |
| FR | 2364004 | 4/1978 |
| GB | 2017522 | 10/1979 |
| JP | 52-18228 | 6/2013 |

OTHER PUBLICATIONS

PCT International Search Report in International Application No. PCT/EP2018/078153, dated Feb. 1, 2019, 12 pages.

PCT International Search Report in International Application No. PCT/EP2018/077278, dated Dec. 20, 2018, 17 pages.

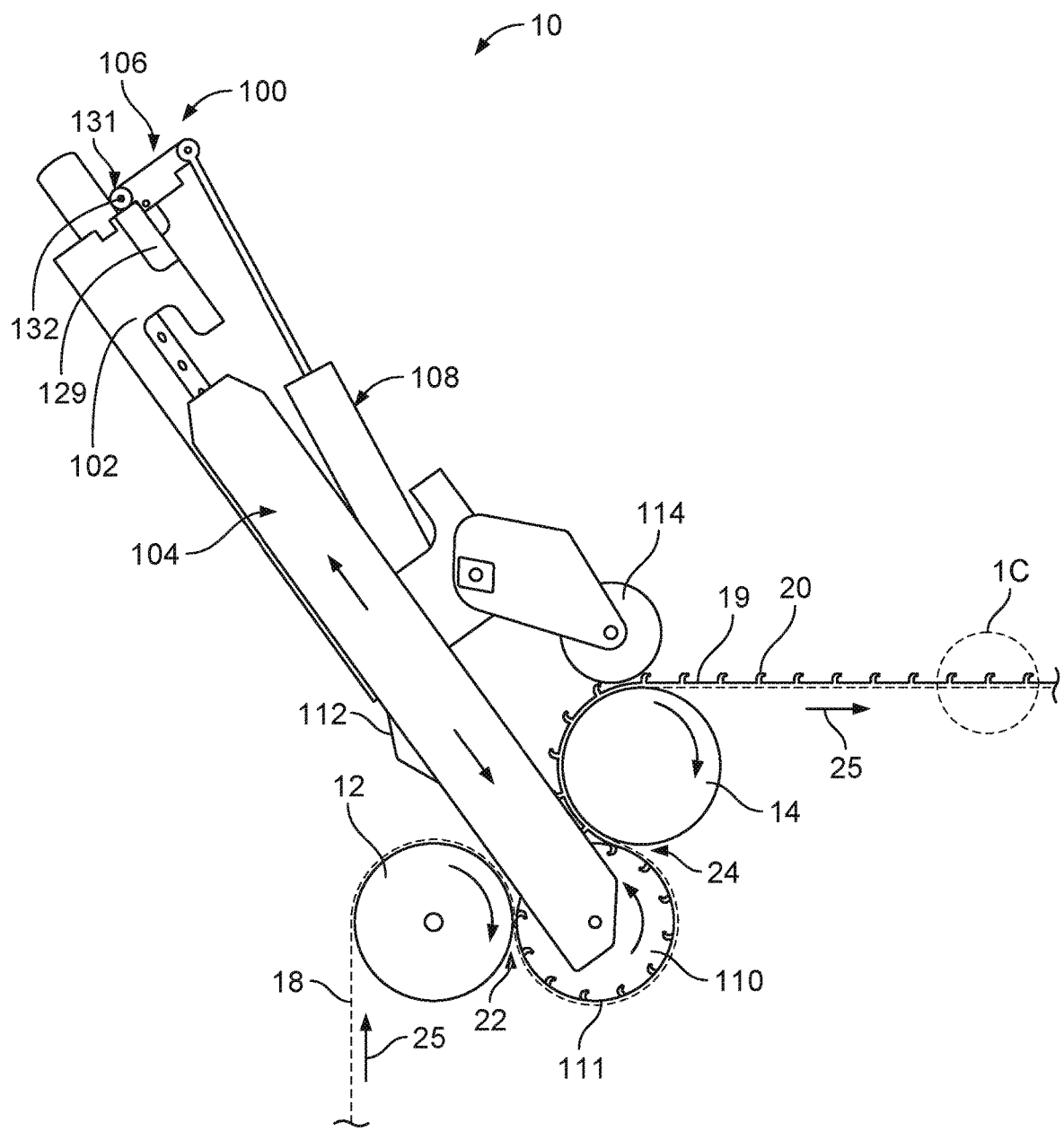
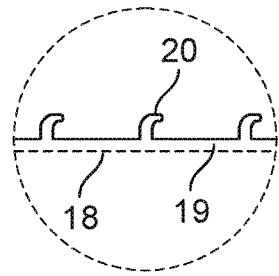
FIG. 1B
FIG. 1C

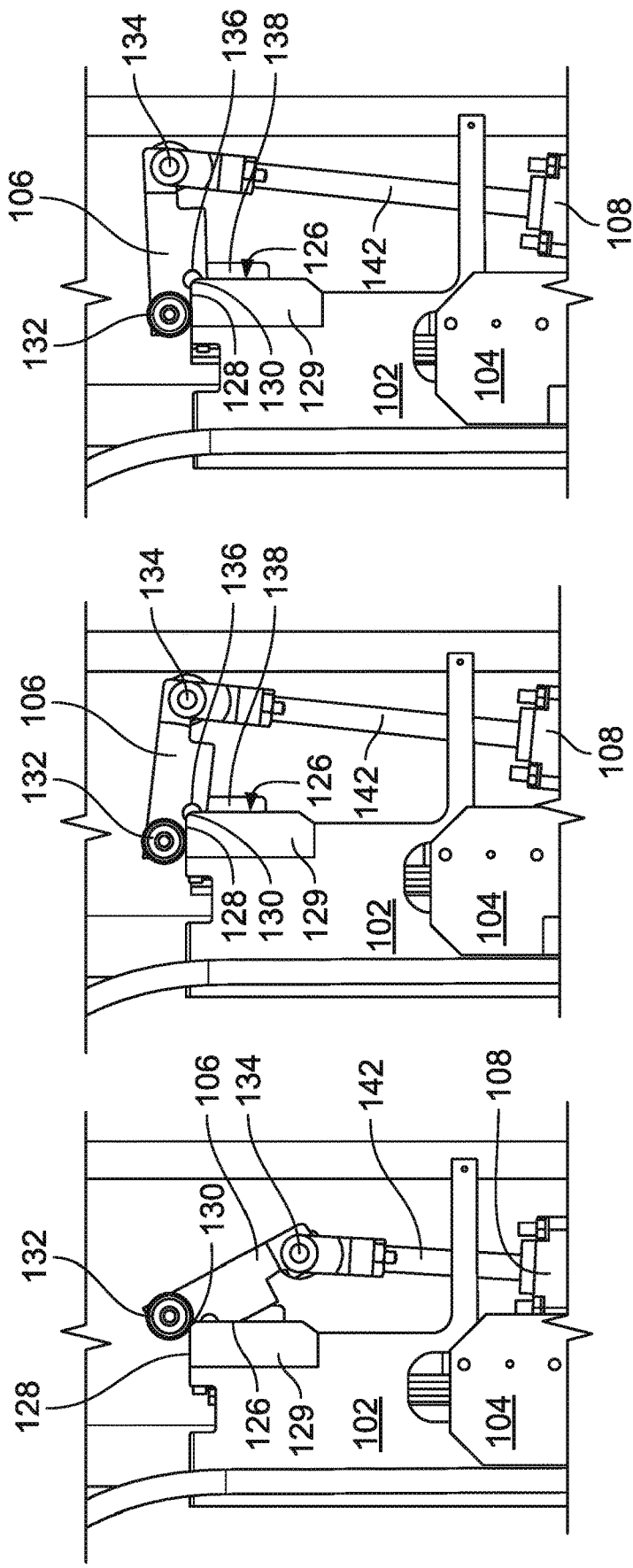

LINEAR ACTUATOR LEVERAGE

TECHNICAL FIELD

This invention relates generally to equipment and methods for connecting a linear actuator for moving a molding roll with respect to a reaction surface, such as for molding resin to make touch fastener products.

BACKGROUND

Roll-molding processes involving particularly viscous resins can require substantial nip pressures. To avoid damaging roll surfaces, such pressure must typically not be applied without resin in the nip between the rolls. Hydraulic cylinders are sometimes used to force the rolls together to create nip pressure. Improvements in the controlled movement and loading of calendering rolls are sought, with one intended application being the movement and loading of a mold roll in a continuous touch fastener manufacturing process.

SUMMARY

One aspect of the present disclosure features a linear actuator leverage assembly that includes a structural base with two exposed surfaces that define a corner therebetween. The two surfaces include a generally straight side surface and a back surface. The leverage assembly also includes a rail member coupled to the base. The rail member is constrained against relative motion other than in a direction generally parallel to the side surface of the base. The leverage assembly further includes a lever arm with a bearing surface. The lever arm is pivotally connected to the rail member at a first pivot spaced from the bearing surface. The leverage assembly also has a linear actuator with a first end coupled to the base and a second end connected to the lever arm at a second pivot spaced from both the bearing surface and the first pivot. The first pivot is located generally between the second pivot and the bearing surface, such that the linear actuator is adapted to move the rail member with respect to the base over a linear stroke of the linear actuator that moves the second pivot along a continuous motion path. The continuous motion path includes a first path segment generally parallel to the side surface, over which the bearing surface moves along the side surface to the corner, and a second path segment that begins at a point where the bearing surface moves past the corner to bear against the back surface, over which the lever arm pivots about the bearing surface as a fulcrum, increasing leverage applied by the actuator to the rail.

In some cases, the bearing surface of the lever arm includes an outer surface of a roller bearing. In some cases, the first pivot is disposed on a same side of a line connecting a rotational axis of the bearing surface and a center of the second pivot as the generally straight side surface of the structural base.

In some examples, the linear actuator includes a drive cylinder configured to be actuated under fluid pressure.

In some embodiments, the first end of the linear actuator is pivotally coupled to the structural base at a pivot coupling. In some examples, the back surface of the structural base faces away from the pivot coupling.

In some cases, the rail member is coupled to a mold roll, such that the mold roll moves along a common axis with the rail member. In some examples, the mold roll has an outer surface that defines an array of molding cavities. In some cases, the leverage assembly is configured such that, as the linear actuator moves the rail member along the second path segment of the second pivot, the mold roll is moved into proximity with a reaction surface to define a pressure zone. In some cases, the reaction surface includes a surface of a rotatable pressure roll. In some cases, the leverage assembly includes a resin source configured to introduce molten resin into the pressure zone to be forced into the molding cavities by pressure in the pressure zone. In some arrangements, the pressure zone between the mold roll and the pressure roll includes a nip into which resin is drawn under shear force developed by rotation of the pressure roll. In some cases, the resin source is configured to supply a continuous flow of resin to the pressure zone, for forming a continuous layer of resin. In some cases, the resin source is configured to supply molten resin in discontinuous quantities, for forming an interrupted layer of resin.

In some arrangements, the rail member is slidably attached to the structural base. In some cases, the linear actuator is configured to translate the rail member at a rate substantially equal to a stroke rate of the linear actuator over the first path segment of the second pivot. In some examples, the linear actuator is configured to translate the rail member at a rate substantially lower than the stroke rate of the linear actuator over the second path segment of the second pivot, to increase leverage applied by the linear actuator.

In some arrangements, the rail member includes a pin block that extends beyond the side surface, to which the lever arm is pivotally connected to rotate about an axis below the side surface.

In some examples, the first pivot of the lever arm is closer to the bearing surface of the lever arm than to the second pivot of the lever arm.

In some embodiments, the back surface of the structural base is generally perpendicular to the side surface of the structural base.

Another aspect of the present disclosure features a method of positioning a rotatable roller with respect to a reaction surface for molding resin. The method includes actuating a linear actuator to translate a coupling arm along a first path segment that extends generally parallel to a side surface of a support coupled to the reaction surface. During such path segment, the rotatable roller translates at a rate substantially equal to a stroke rate of the linear actuator, until a bearing surface of the coupling arm reaches a corner between the side surface and a back surface of the support. The method further includes continuing to actuate the linear actuator to move the bearing surface beyond the corner to bear against the back surface. Such motion pivots the coupling arm about the bearing surface as a fulcrum, thereby translating the rotatable roller at a rate substantially lower than the stroke rate of the linear actuator to increase leverage applied by the linear actuator.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1B is a side elevation view of the molding apparatus of FIG. 1A, with the leverage assembly in an engaged position.

FIG. 1C is an enlarged view of area 1C in FIG. 1B.

FIGS. 8A-E sequentially illustrate the motion of the lever arm.

Like reference symbols in the various drawings indicate like elements.

DETAILED DESCRIPTION

Figure 1A:
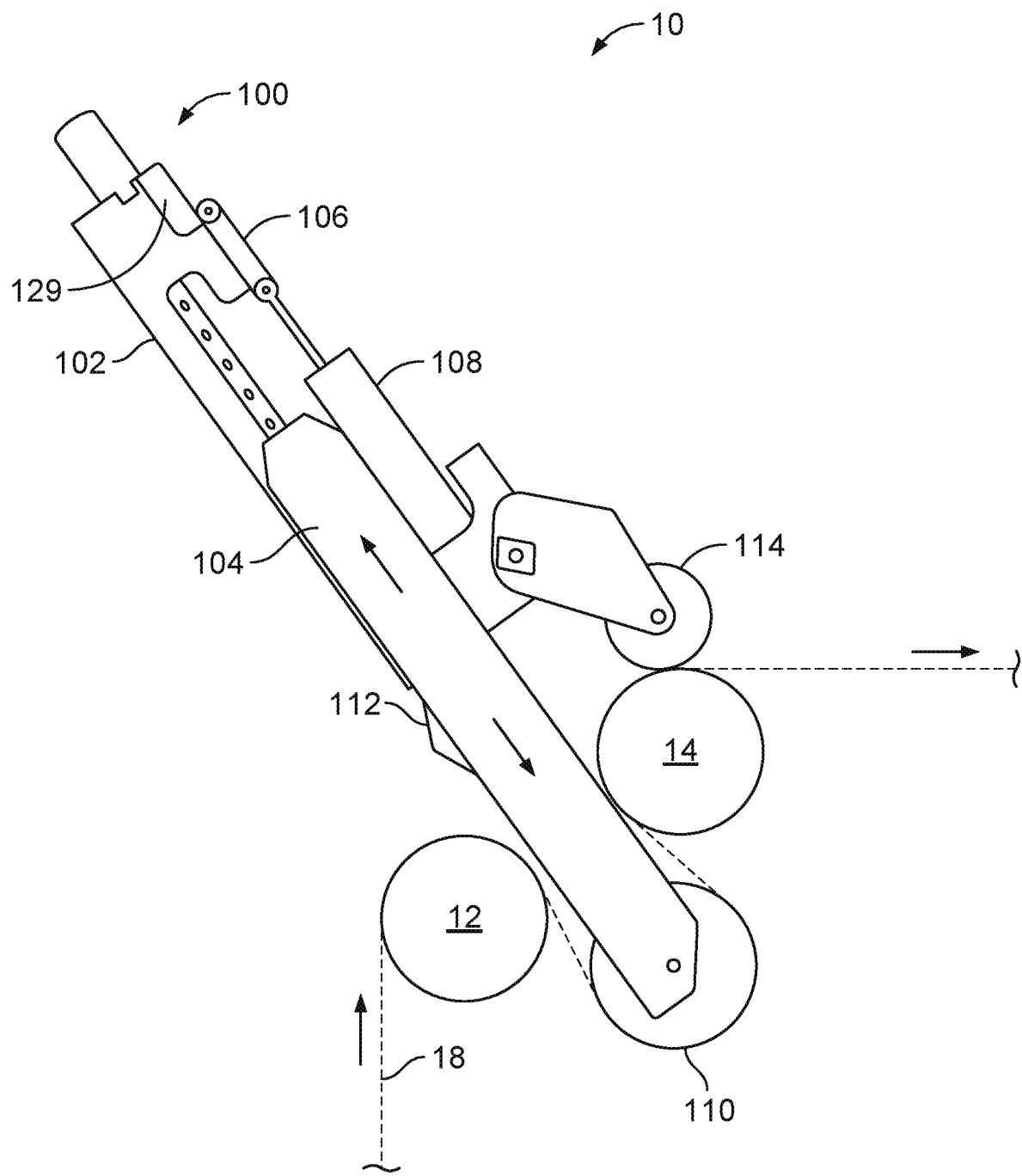
FIG. 1A is a side elevation view of a molding apparatus and method for laminating resin onto a pleated product, having a leverage assembly in a disengaged position.

Referring first to FIGS. 1A-C, a molding apparatus 10 for producing fastener products features a linear actuator leverage assembly 100 that has a structural base 102, a rail member 104, a lever arm 106, and a linear actuator 108 (e.g., a drive cylinder). Leverage assembly 100 is positioned to mold resin in collaboration with a pair of spaced-apart, fixed-axis processing rollers 12 and 14, which are driven to rotate about their respective axes. Structural base 102 is fixed in position with respect to the processing roller axes, while rail member 104 moves along the length of base 102. As shown in FIG. 1B, molding apparatus 10 defines a processing direction 25 and uses a continuous extrusion/roll-forming method for forming fastener elements 20 on an integral, resin sheet-form base 19. An extrusion head 112 attached to structural base 102 supplies a sheet of molten resin (not shown) to a pressure zone or molding nip 22 between a mold roll 110 and processing roller 12, which functions as a counter-rotating pressure roll and drive roll.

Mold roll 110 is attached to a distal end of rail member 104, by which it is movable toward and away from processing rollers 12 and 14. Mold roll 110 defines an array of miniature molding cavities extending inward from its periphery 111 for molding fastener elements 20. The pressure in nip 22 forces resin to enter and fill the exposed molding cavities, while excess resin forms base 19 on the peripheral surface of the mold roll and interconnects the filled cavities that form fastener elements 20. Mold roll 110 is continuously cooled, e.g., by controlled flow of coolant through its interior, heat is extracted from the product as the product passes through first nip 22 and travels to a second nip 24 between mold roll 110 and processing roller 14, which functions as a counter-rotating drive roll. Alternatively, processing rollers 12 and 14, or an external source, can provide cooling to the resin, as the only cooling source or in collaboration with mold roll 110. The heat removal solidifies fastener elements 20 (e.g., hooks), subsequently allowing elements 20 to be peeled from their fixed cavities by drive roll 14, also referred to as a take-off roll. Hooks 20 are then leveled uniformly by a knock-down roll 114 attached to structural base 102.

FIG. 1A shows the molding apparatus in a non-operating position, where the leverage assembly 100 is disengaged with processing rollers 12 and 14. To disengage leverage assembly 100, rail member 104 moves along base 102 to position mold roll 110 away from the processing rollers. A substrate 18, shown in dashed lines, may be trained about the rollers in order to mold resin on a surface of substrate 18. Substrate 18 is preferably a non-woven fabric. To start up the machine, rail member 104 moves mold roll 110 away from processing rollers 12 and 14, and substrate 18 is then positioned about the processing rollers and mold roll 110, extending in the processing direction. As shown in FIG. 1B, when rail member 104 moves mold roll 110 in position against pressure roll 12 and drive roll 14, with resin between the rollers in the nips, the apparatus is configured to mold fastener elements while laminating resin base 19 to the surface of substrate 18. Substrate 18 is laminated to the resin in pressure nip 22 and is carried about mold roll 110 with the solidifying resin. Substrate 18 is then stripped from mold roll 110 at nip 24 with the solidified resin, and exits molding apparatus 10 as the fastener product shown in FIG. 1C.

Figure 2:
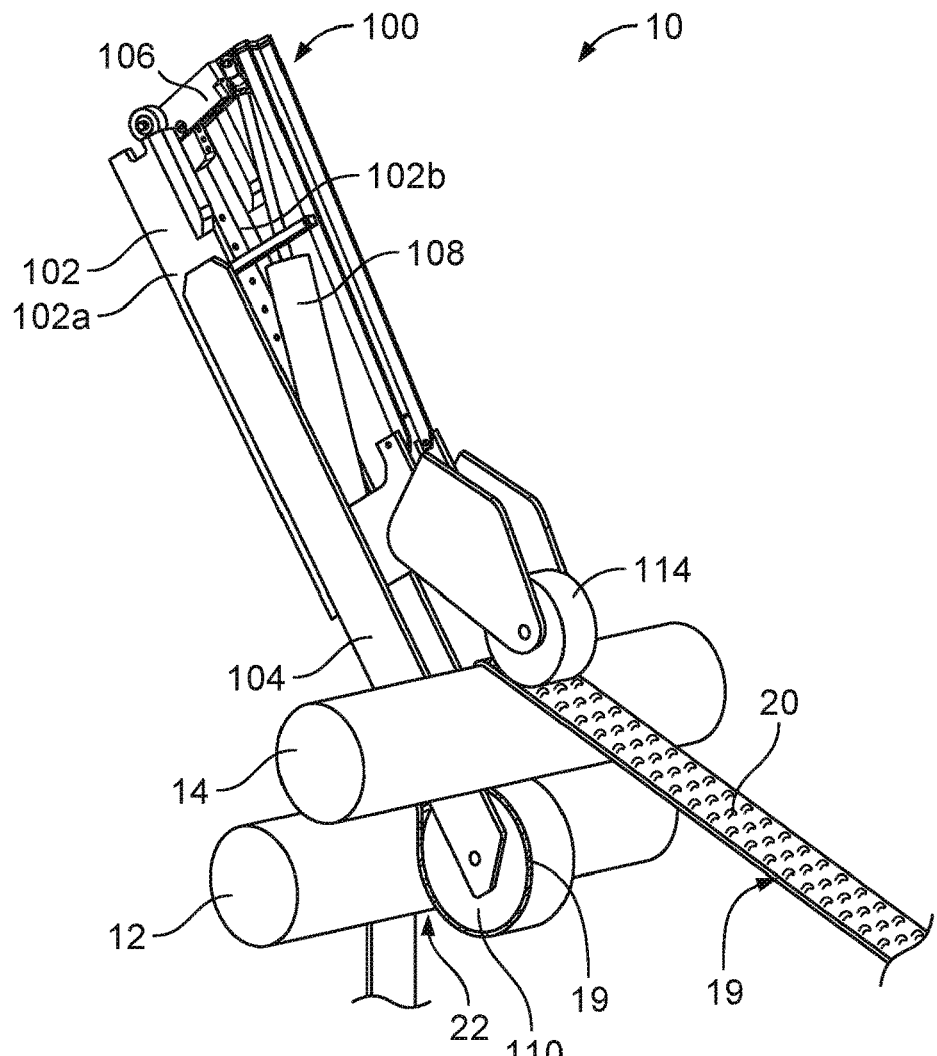
FIG. 2 is a perspective view of the molding apparatus with the leverage assembly in an engaged position.
Figure 3:
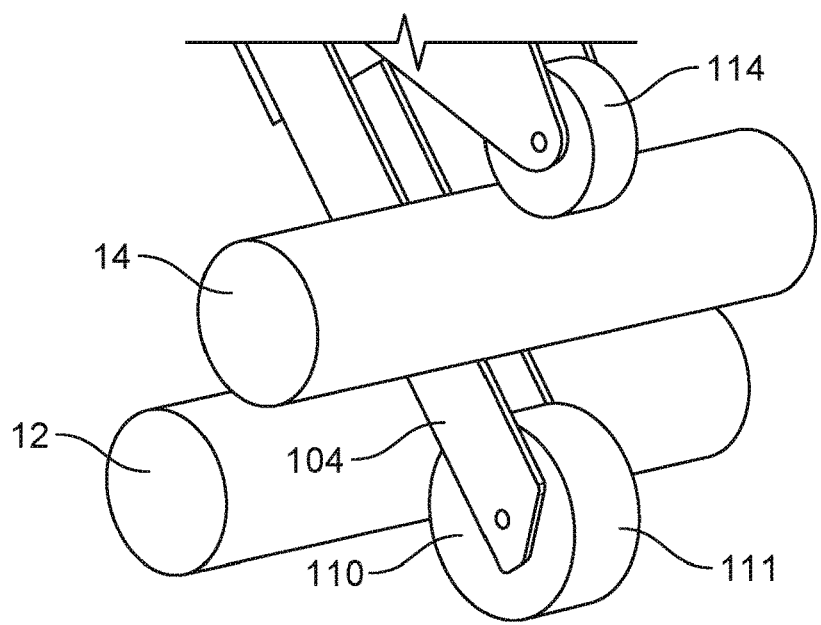
FIG. 3 is a perspective view of a section of the molding apparatus, with the leverage assembly in a disengaged position.

Referring now to FIGS. 2 and 3, pressure roll 12 and drive roll 14 have generally the same length, both rollers being longer than mold roll 110 and knock-down roll 114. Leverage assembly 100 is relatively narrow, and, when mold roll 110 is disengaged from pressure roll 12 and drive roll 14, assembly 100 can be moved in a lateral direction along the length of both rollers 12 and 14. This allows mold roll 110 to be placed in different locations along the length of pressure roll 12 enabling, for example, pressure roll 12 and drive roll 14 to provide a common reaction surface to multiple leverage assemblies 100. Alternatively, leverage assembly 100 can be positioned to apply resin at any selected position across the width of a wide substrate sheet.

Pressure roll 12 and drive roll 14 rotate in the same direction and, when in engagement with mold roll 110, both rollers drive mold roll 110 to rotate. Mold roll 110 is a passive roller, only rotating by movement of pressure roll 12 and drive roll 14. Drive roll 14 engages outer surface 111 of mold roll 110 through resin base 19 on outer surface 111, and pressure roll 12 engages mold roll 110 through the resin dropped into nip 22. When molding on a substrate, the rollers also engage through the thickness of the substrate in the nips. As shown in FIG. 3, when rail 104 is extended, mold roll 110 is spaced from the processing rollers 12 and 14 and readily accessible to be changed or serviced. This position of mold roll 110 also allows other components such as the processing rollers or rail member 104 to be changed or serviced, or for a substrate to be threaded between the rolls during setup.

Figures 4A, 4B:
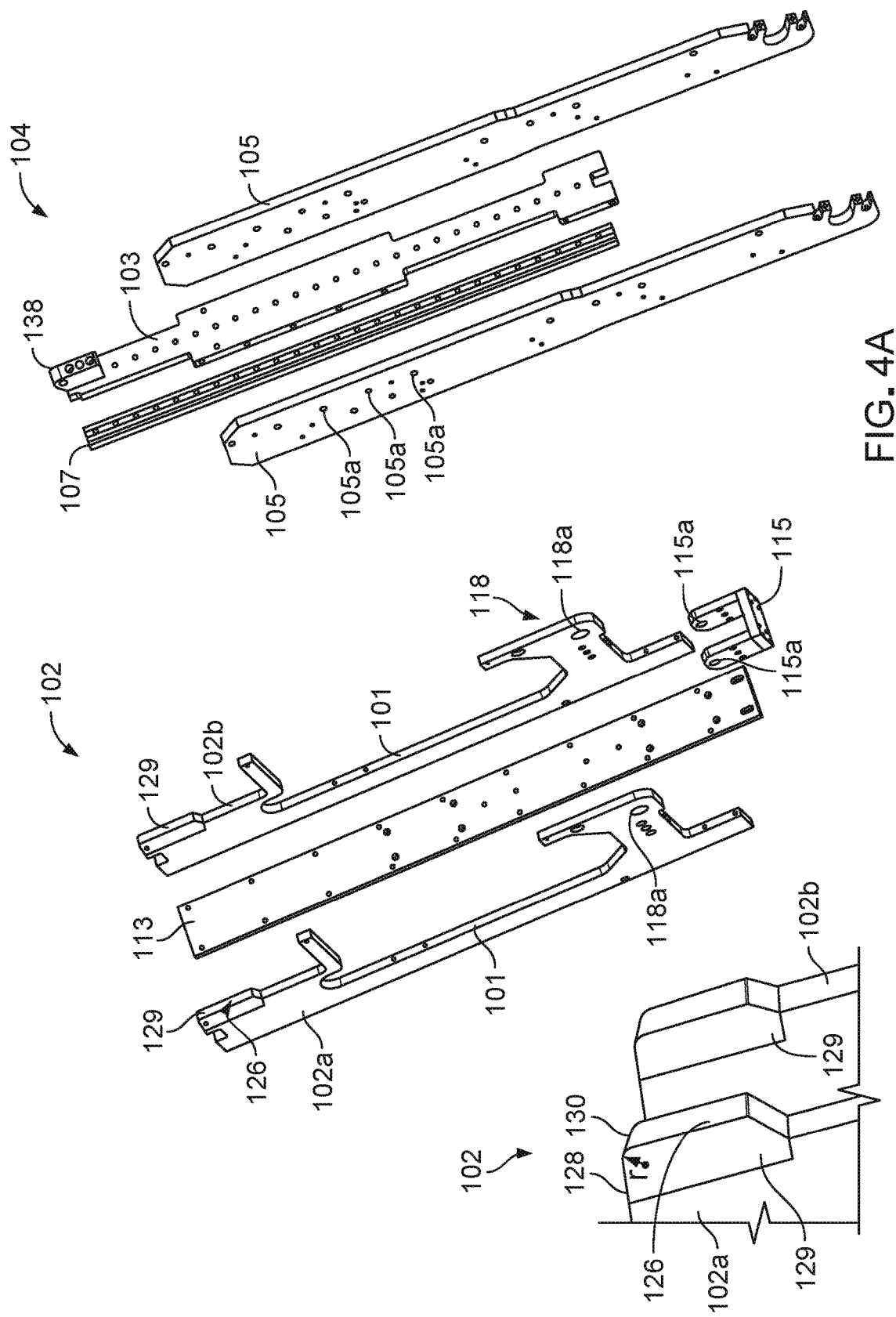
FIG. 4A is an exploded view of a structural base and rail member of the leverage assembly.
FIG. 4B is an enlarged view of a section of the structural base, showing a corner piece.

Referring to FIGS. 4A and 4B, structural base 102 has a U-shaped channel with two opposite walls 102a and 102b, a web plate 113, and a bracket 115 coupled to a bottom end between the opposite walls. Each wall 102a and 102b defines an open slot 101 in the middle, and a corner piece 129 attached at a distal, upper end. At one end of open slot 101, each wall 102a and 102b defines an L-shaped structure 118 with holes 118a that define a connection for a linking arm that carries the knock-down roll 114 of FIG. 1A. Bracket 115 is attached between the L-shaped structures and has holes 115a that define a connection for the drive cylinder 108 of FIG. 1A. Web 113 has linear carriages (not shown) that are configured to receive guide rail 107, securing guide rail 107 in a fixed lateral position with respect to base 102 while allowing linear motion along rail 107.

Referring to FIG. 4B, corner piece 129 is made of a rigid material such as hardened steel and features two exposed surfaces: a side surface 126 and a back surface 128, defining between them a corner 130. Side surface 126 and back surface 128 are both straight, with back surface 128 being generally perpendicular to side surface 126. Alternatively, back surface 128 can be curved or otherwise profiled, and/or extend in a different direction, such as forming an obtuse or an acute angle with side surface 126. Corner 130 is rounded, having a corner radius 'r' of around 7.5 mm. Corner piece 129 is permanently secured to the rest of base 102.

FIG. 4A also shows an exploded view of rail member 104, which is made of four components attached together and configured to connect to structural base 102. A middle plate 103 is fixed to rail 107. Middle plate 103 has a top end with a pin block 138 extending beyond the edges of mounting arms 105 when assembled, and connects to a lever arm as further discussed in FIGS. 5A-C. The wider part of middle plate 103 extends beyond slots 101 when assembled. Each mounting arm 105 of the rail member has holes 105a for receiving screws to connect to middle plate 103. One mounting arm 105 connects to each side of middle plate 103 such that, when assembled with base 102, middle plate 103 is disposed inside base 102 and mounting arms 105 are disposed outside the base. This connection constrains rail member 104 against relative motion other than in a direction parallel to side surface 126 of base 102.

Figure 5A:
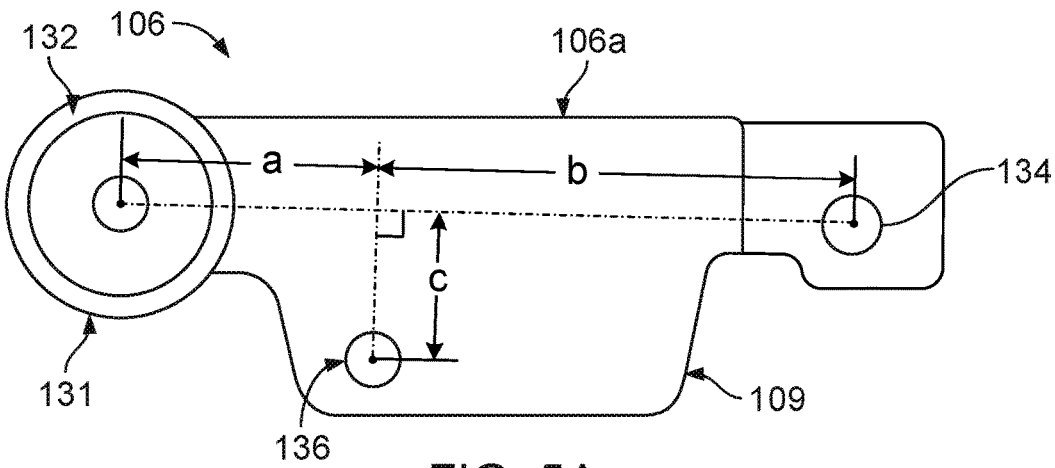
FIG. 5A is a side view of a lever arm.
Figure 5B:
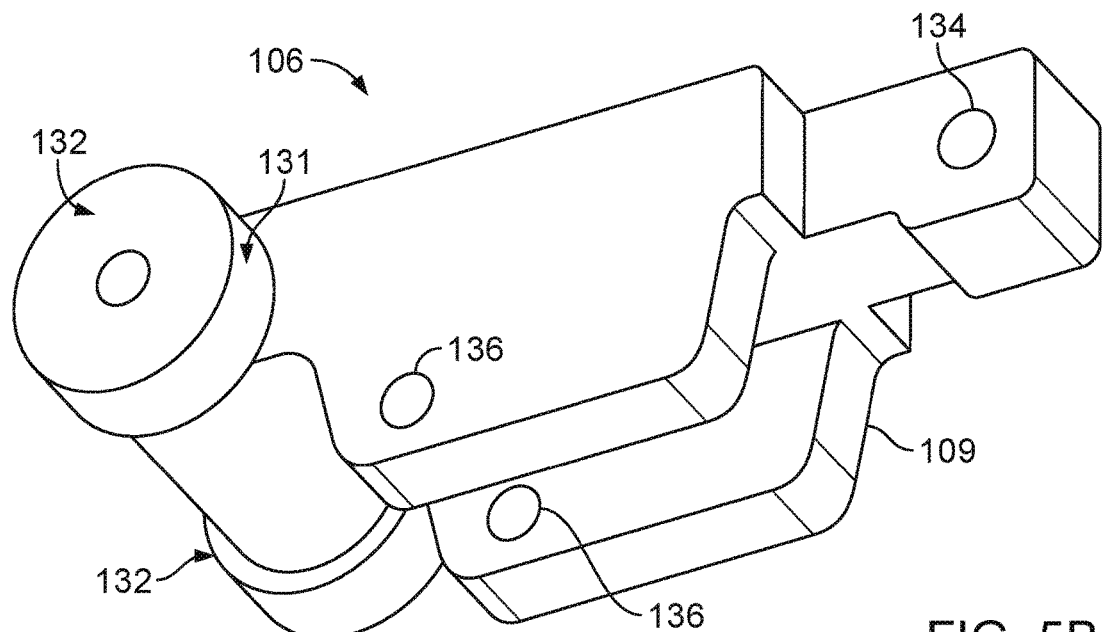
FIG. 5B is a perspective view of the lever arm.
Figure 5C:
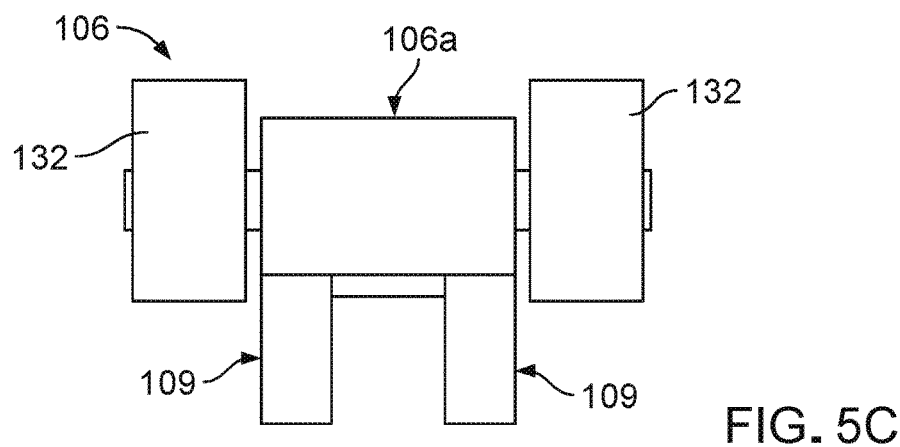
FIG. 5C is a back view of the lever arm.

Referring next to FIGS. 5A-C, lever arm 106 is a rigid beam made of mild steel or equivalent material. Lever arm 106 has two ribs 109 with holes defining pivot 136 that together define a pivot axis and that receive a pin for pivotally connecting to pin block 138 of rail member 104 (FIG. 4A). Lever arm 106 has a first end connected to a pair of roller bearings 132 and a second end defining a second pivot hole 134 for connecting to drive cylinder 108 at another pivotable pin connection. Each roller bearing 132 has a peripheral bearing surface 131. Roller bearings 132 are coaxially connected to lever arm 106, with one roller bearing 132 on each side of lever arm 106. Pivot 136 is located between second pivot hole 134 and roller bearings 132 along the length of the lever arm, farther from a top surface 106a of lever arm 106 than either the axis of roller bearings 132 or the second pivot hole 134. An axis of rotation of roller bearing 132 is at a longitudinal distance 'a' from a center of first pivot 136, and the center of first pivot 136 is at a longitudinal distance 'b' from a center of second pivot hole 134. The center of first pivot 136 is disposed on the same side of a line connecting the centers of bearing surface 131 and second pivot hole 134 as the side surface on which bearing 132 rolls, to cause rotation of the lever arm in the proper direction and to cause the roller bearing to move around the corner. In one example, distances 'a', 'b', and 'c' are 32, 111, and 22 millimeters, respectively, and can be made of similar proportions. The proportions of these dimensions can be modified to alter the operational attributes of the leverage assembly. For instance, distance 'b' may be increased to generate greater leverage when higher nip pressure is required. In addition, the shape of lever arm can be altered to adapt for different connections with the drive cylinder, rail connection block and/or roller bearings 132. Alternatively, instead of roller bearings 132, lever arm 106 can include cam rollers or a different object with a bearing surface, including a fixed bearing (cam) surface.

Figure 6A:
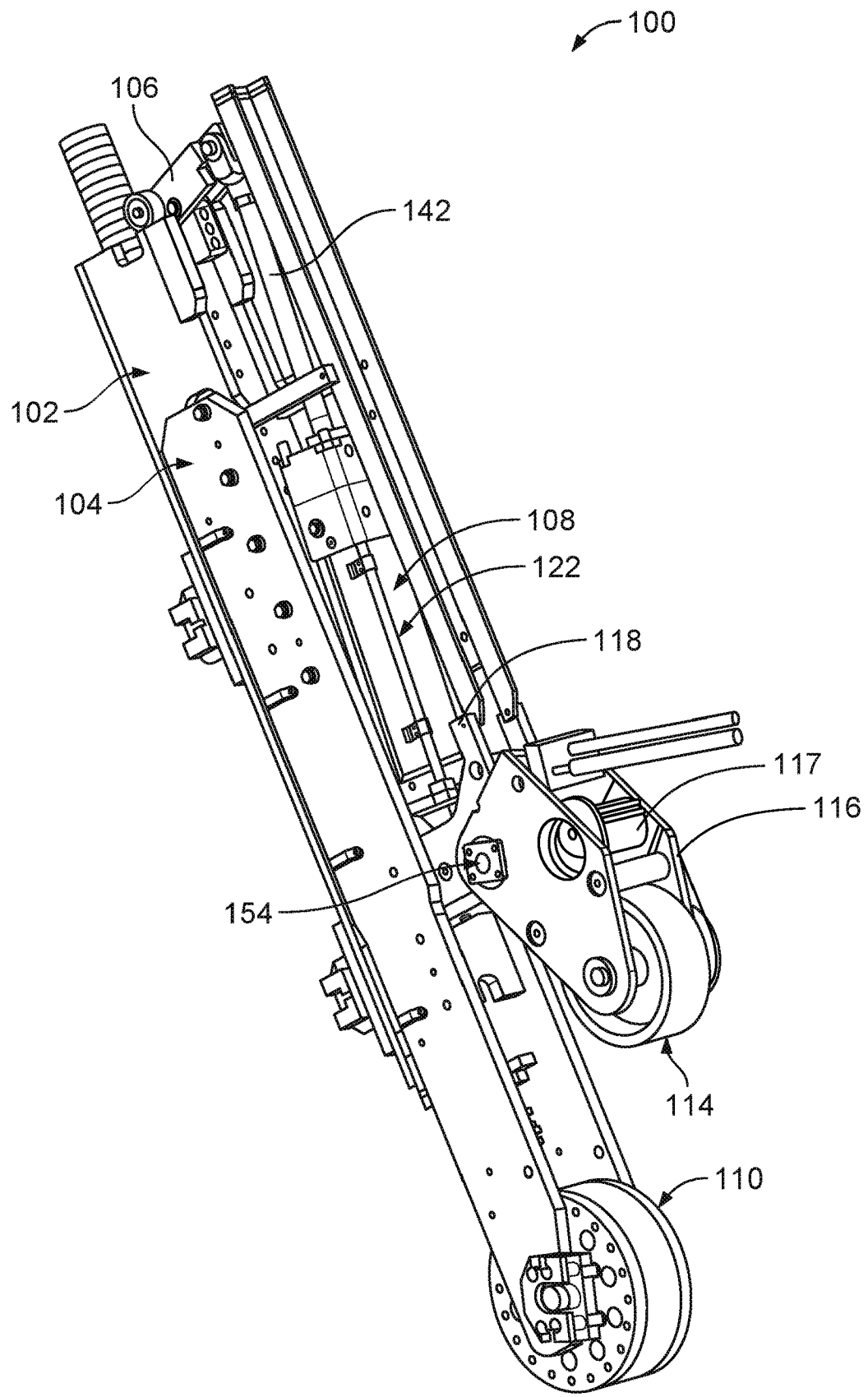
FIG. 6A is a perspective view of the leverage assembly.
Figure 6B:
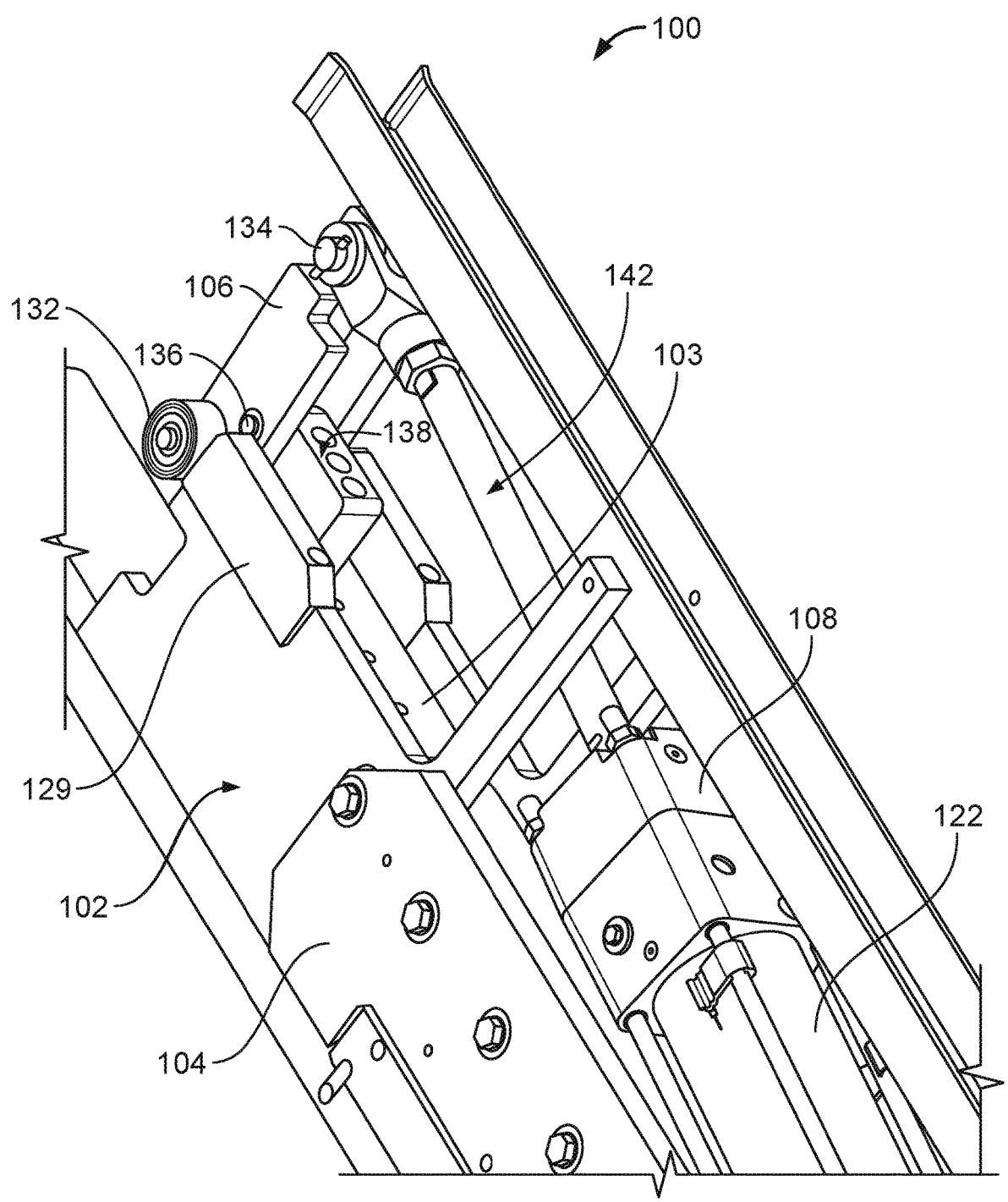
FIG. 6B is a perspective view of a section of the leverage assembly.

Referring to FIGS. 6A and 6B, drive cylinder 108 of leverage assembly 100 includes a cylinder rod 142 and a cylinder barrel 122. Barrel 122 is pivotally connected to base 102 at a pivot coupling between L-shaped structures 118, and rod 142 is pinned to lever arm 106 at second pivot hole 134. Alternatively, drive cylinder 108 can be mounted in the opposite direction, with rod 142 connected to the base and barrel 122 connected to lever arm 106, disposed above the lever arm, on an opposite side of the lever arm as the mold roll. Drive cylinder 108 may be any type of controllable linear actuator, such as a pneumatic or hydraulic cylinder actuated under fluid pressure, a ball screw actuator, or a linear motor.

In addition, knock-down roll 114 is mounted on a linking arm 116 that is connected to base 102. Linking arm 116 biases knock-down roll 114 downward against an adjustable positive stop by virtue of a spring loaded shaft connection 154 with internal torsion springs and/or compression springs. Pressure applied by knock-down roll 114 to the freshly molded tape pushes down against the fastener elements to level them, making the fastener product more uniform. Knock-down roll 114 need only be of sufficient width to engage the fastener elements molded by mold roll 110. Knock-down roll 114 is belt-driven by a motor 117, either to run at the same surface speed as the molded tape, or at a speed differential to impart a lateral force to the cooling heads during knock-down.

Figure 7:
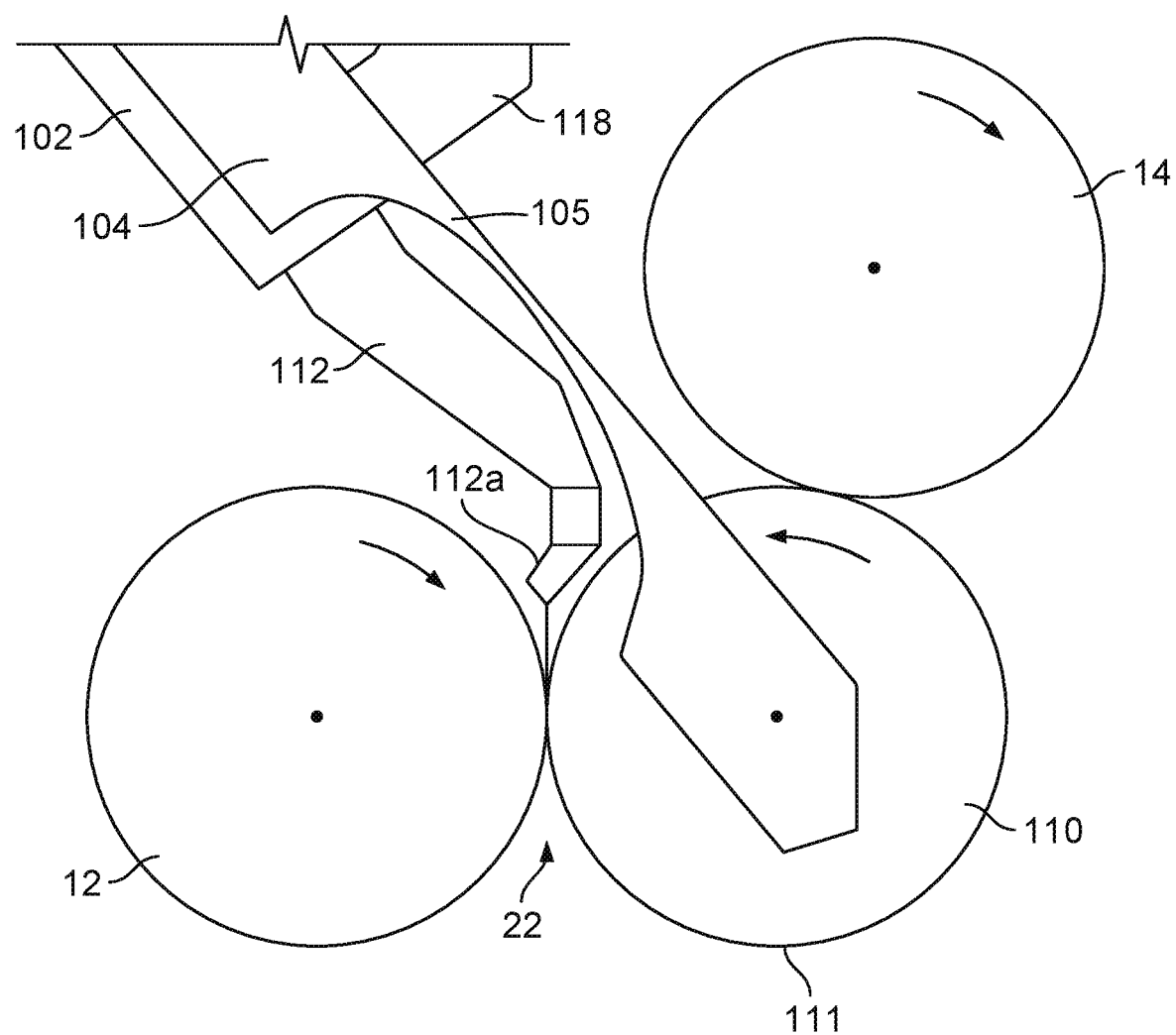
FIG. 7 is a schematic side view of the molding apparatus, showing an extrusion head attached to the leverage assembly.

Referring now to FIG. 7, extrusion head 112 is connected to a bottom end of base 102, between mounting arms 105 of rail member 104. Extrusion head 112 includes a nozzle 112a for introducing molten resin to molding nip 22. The position of head 112 is adjustable such as to position nozzle 112a directly above nip 22, such that the extruded molten resin is drawn vertically into nip 22 by the moving rolls. The nozzle position is adjustable, to direct the flow onto either of the two rolls, if desired, to be carried into nip 22 by rotation of the rollers. Head 112 can be configured to introduce molten resin continuously or, when using a substrate, in a series of discrete amounts, to form islands spaced apart longitudinally over the substrate to form an interrupted strip of fastener elements.

Pressure roll 12 and drive roll 14 rotate about fixed axes that do not move with respect to base 102, and are each driven by a direct drive motor or a belt drive motor (not shown). Both rollers 12 and 14 have a relatively hard surface, such as of a metal sleeve covering a softer, more compliant layer made of an elastomeric material or a fluid under pressure. Alternatively, pressure roll 12 can have a compliant surface such as an elastomeric material, reducing the chance of surface fatigue damage that might be caused by two hard rollers contacting under pressure in an absence of resin, and also accommodating a slight variation in the diameter of the mold roll. Alternatively, rollers 12 and 14 can be non-compliant. Some compliance in the nips is also provided by the properties of the pneumatic cylinder pressure system.

Figure 8B:
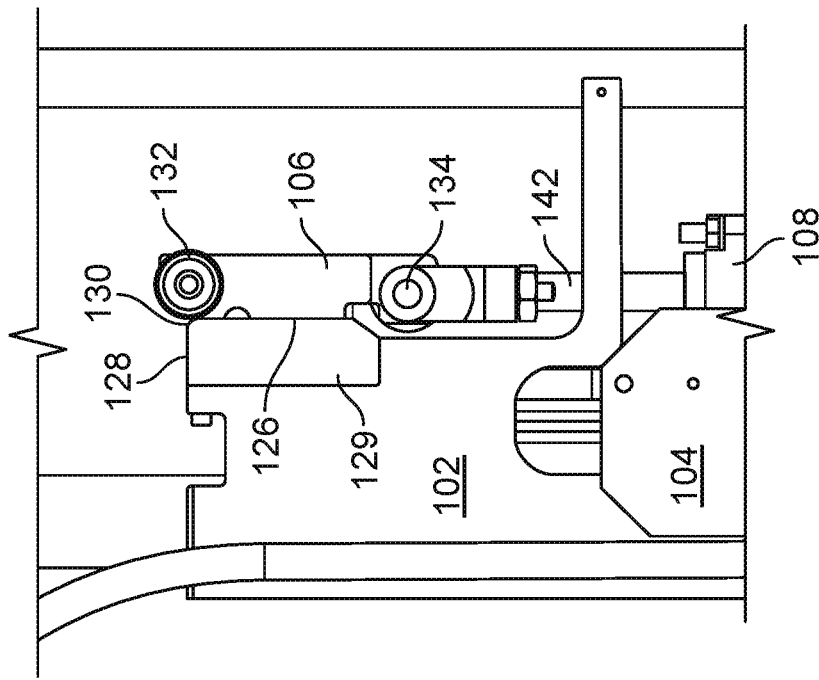
Figure 8A:
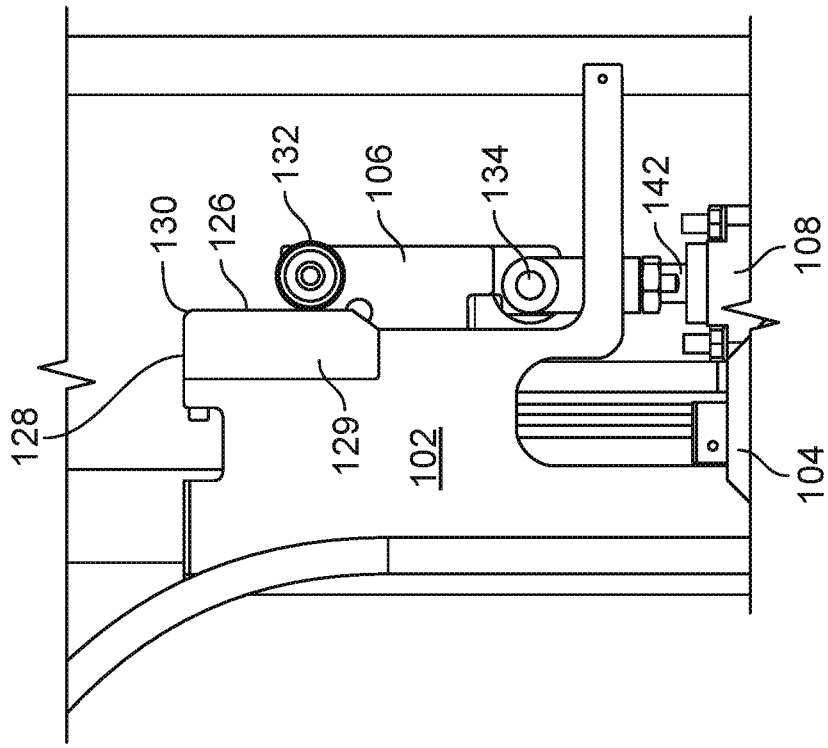
Figure 9:
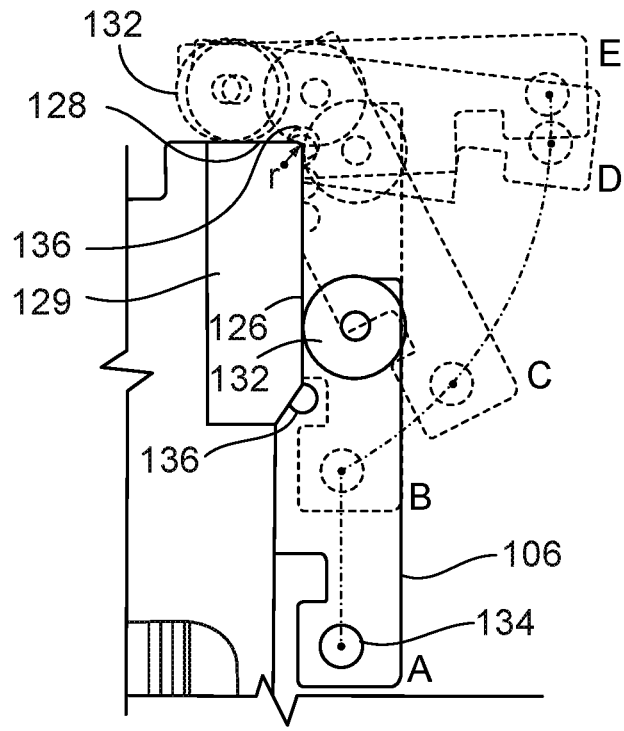
FIG. 9 is a schematic illustration of the path of the lever arm starting from point A and moving to point E.

FIGS. 8A-E and 9 sequentially show how the components of the leverage assembly work together to increase leverage applied by the actuator. More specifically, the motion of lever arm 106 and rail member 104 is illustrated, as lever arm 106 travels along corner piece 129 when drive cylinder 108 is actuated. FIG. 9 shows the motion path of second pivot 134 illustrated by a dashed line, starting from point A and ending at point E. As shown in FIG. 8A, starting when drive cylinder is in a retracted position, lever arm 106 is positioned longitudinally parallel to side surface 126. When drive cylinder 108 extends cylinder rod 142, roller bearings 132 roll along corner piece 129, moving from side surface 126, around the corner, to back surface 128 of corner piece 129. During this motion, lever arm 106 moves rail member 104 (due to the connection at pivot 136) with respect to base 102 over a linear stroke of drive cylinder 108 that moves second pivot 134 along a continuous motion path. The five silhouettes of lever arm 106 shown in FIG. 9 represent the 'trail' of lever arm 106 as the lever arm moves along the continuous motion path from point A to point E. The continuous motion path includes a first path segment and a second path segment. As the first path segment progresses, cylinder 108 extends rod 142 moving lever arm 106 parallel to side surface 126 in an upward direction, over which roller bearings 132 roll along side surface 126 to corner 130 (FIG. 8B). This motion is illustrated in FIG. 9 as the second pivot 134 of the lever arm moves from point A to point B. Over the first path segment of second pivot 134, drive cylinder 108 translates rail member 104 at a rate substantially equal to a stroke rate of cylinder 108, forming a one-to-one ratio.

FIGS. 8C-E show at least part of the second path segment of second pivot 134. The second path segment begins when roller bearings 132 begin to move around corner 130 to bear against back surface 128. As roller bearings 132 roll around corner 130, lever arm 106 pivots about a distant center that gets nearer as the roller bearings 132 move toward back surface 128, until the roller bearings are at the rear surface and the lever arm is essentially perpendicular to the cylinder rod, as shown in FIG. 8D and the leverage is at its maximum, as the ratio of (a+b)/a. During further motion, lever arm 106 pivots about roller bearings 132 as a fulcrum (from point D to point E in FIG. 9), continuing to apply force to rail member 104 at a significantly increased leverage. In other words, during the second path segment, lever arm forms a 'second class lever' (e.g., similar to the motion of a wheelbarrow) as shown in FIGS. 8D and 8E. The second class lever is formed with the force being imparted by drive cylinder 108, the load applied by rail member 104 connected at first pivot 136, and roller bearing 132 acting as the fulcrum.

Figure 10:
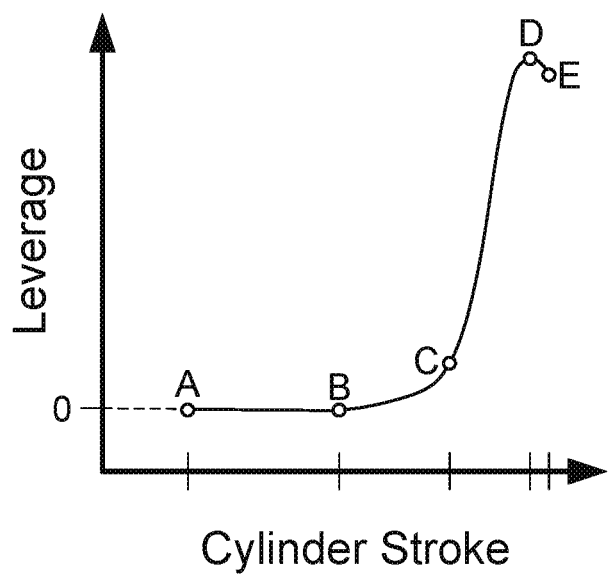
FIG. 10 is a graph of leverage versus cylinder stroke or the motion of the stroke as it moves the lever arm over the path illustrated in FIG. 9.

Referring to FIG. 10, a graph of leverage versus cylinder stroke is shown, representing the change in leverage as the cylinder moves the lever arm over the path shown in FIG. 9. There is no force amplification from point A to point B, and from point B to point D leverage increases significantly. Leverage is at its maximum value at point D, where lever 106 is perpendicular with respect to the cylinder rod (as in FIG. 8D). Once the lever arm passes point D, leverage slightly decreases. The distance from point D to point E is relatively small, covering the small distance mold roll 110 moves from its initial engagement with processing rollers 12 and 14 to a distance close enough to generate significant nip pressure.

Referring also to FIGS. 2 and 3, as lever arm 106 moves over the linear stroke of cylinder 108, rail member moves mold roll 110 toward pressure roll 12 and drive roll 14, applying pressure to both rollers 12 and 14. This happens in a two-step process, starting with the rail member 104 extended and the mold roll disengaged (as in FIG. 3). First, motion along the first path segment brings mold roll 110 into close proximity with pressure roll 12 and drive roll 14, under no resistance. Second, as drive cylinder 108 continues to extend, moving the lever arm along the second path segment of second pivot 134 and continuing to raise the rail member, mold roll 110 is moved into closer proximity with pressure roll 12 with sufficiently leveraged force to generate the necessary nip pressure to fill the mold cavities and to engage the roll surfaces to cause rotation of the mold roll. During molding, nip pressure can be controlled by cylinder motion, increasing nip pressure by extending cylinder rod 142 and decreasing nip pressure by retracting cylinder rod 142.

While a number of examples have been described for illustration purposes, the foregoing description is not intended to limit the scope of the invention, which is defined by the scope of the appended claims. There are and will be other examples and modifications within the scope of the following claims.

What is claimed is:

1. A linear actuator leverage assembly comprising:
    a structural base having two exposed surfaces defining a corner therebetween, the two surfaces including a generally straight side surface and a back surface;
    a rail member coupled to the base and constrained against relative motion other than in a direction generally parallel to the side surface of the base;
    a lever arm having a bearing surface, the lever arm pivotally connected to the rail member at a first pivot spaced from the bearing surface; and
    a linear actuator having a first end coupled to the base and a second end connected to the lever arm at a second pivot spaced from both the bearing surface and the first pivot, with the first pivot disposed generally between the second pivot and the bearing surface, such that the linear actuator is adapted to move the rail member with respect to the base over a linear stroke of the linear actuator that moves the second pivot along a continuous motion path, including:
        a first path segment generally parallel to the side surface, over which the bearing surface moves along the side surface to the corner; and
        a second path segment, beginning at a point where the bearing surface moves past the corner to bear against the back surface, over which the lever arm pivots about the bearing surface as a fulcrum, thereby increasing leverage applied by the actuator to the rail.

2. The leverage assembly of claim 1, wherein the bearing surface of the lever arm comprises an outer surface of a roller bearing.

3. The leverage assembly of claim 2, wherein the first pivot is disposed on a same side of a line connecting a rotational axis of the bearing surface and a center of the second pivot as the generally straight side surface of the structural base.

4. The leverage assembly of claim 1, wherein the linear actuator comprises a drive cylinder configured to be actuated under fluid pressure.

5. The leverage assembly of claim 1, wherein the first end of the linear actuator is pivotally coupled to the structural base at a pivot coupling.

6. The leverage assembly of claim 5, wherein the back surface of the structural base faces away from the pivot coupling.

7. The leverage assembly of claim 1, wherein the rail member is coupled to a mold roll, such that the mold roll moves along a common axis with the rail member.

8. The leverage assembly of claim 7, wherein the mold roll has an outer surface defining an array of molding cavities.

9. The leverage assembly of claim 8, wherein the leverage assembly is configured such that, as the linear actuator moves the rail member along the second path segment of the second pivot, the mold roll is moved into proximity with a reaction surface to define a pressure zone.

10. The leverage assembly of claim 9, wherein the reaction surface comprises a surface of a rotatable pressure roll.

11. The leverage assembly of claim 10, wherein the leverage assembly includes a resin source configured to introduce molten resin into the pressure zone to be forced into the molding cavities by pressure in the pressure zone.

12. The leverage assembly of claim 11, wherein the pressure zone between the mold roll and the pressure roll comprises a nip into which resin is drawn under shear force developed by rotation of the pressure roll.

13. The leverage assembly of claim 11, wherein the resin source is configured to supply a continuous flow of resin to the pressure zone, for forming a continuous layer of resin.

14. The leverage assembly of claim 11, wherein the resin source is configured to supply molten resin in discontinuous quantities, for forming an interrupted layer of resin.

15. The leverage assembly of claim 1, wherein the rail member is slidably attached to the structural base.

16. The leverage assembly of claim 1, wherein the linear actuator is configured to translate the rail member at a rate substantially equal to a stroke rate of the linear actuator over the first path segment of the second pivot.

17. The leverage assembly of claim 15, wherein the linear actuator is configured to translate the rail member at a rate substantially lower than the stroke rate of the linear actuator over the second path segment of the second pivot, to increase leverage applied by the linear actuator.

18. The leverage assembly of claim 1, wherein the rail member comprises a pin block extending beyond the side surface, to which the lever arm is pivotally connected to rotate about an axis below the side surface.

19. The leverage assembly of claim 1, wherein the first pivot of the lever arm is closer to the bearing surface of the lever arm than to the second pivot of the lever arm.

20. The leverage assembly of claim 1, wherein the back surface of the structural base is generally perpendicular to the side surface of the structural base.

21. A method of positioning a rotatable roller with respect to a reaction surface for molding resin, the method comprising:

Actuating a linear actuator to translate a lever arm along a first path segment extending generally parallel to a side surface of a support coupled to the reaction surface, thereby translating the rotatable roller at a rate substantially equal to a stroke rate of the linear actuator, until a bearing surface of the lever arm reaches a corner between the side surface and a back surface of the support; and then Continuing to actuate the linear actuator to move the bearing surface beyond the corner to bear against the back surface, to pivot the lever arm about the bearing surface as a fulcrum, thereby translating the rotatable roller at a rate substantially lower than the stroke rate of the linear actuator to increase leverage applied by the linear actuator.

* * * * *